United States Patent [19]

Nakai et al.

[11] Patent Number: 5,005,672
[45] Date of Patent: Apr. 9, 1991

[54] AIR GAP APPARATUS FOR A LINEAR MOTOR

[75] Inventors: Keiichiro Nakai, Tokyo; Yoshinori Nakanishi, Chiba, both of Japan

[73] Assignee: Otis Elevator Company, Farmington, Conn.

[21] Appl. No.: 493,591

[22] Filed: Feb. 26, 1990

[30] Foreign Application Priority Data

Feb. 28, 1989 [JP] Japan .................................. 1-49714

[51] Int. Cl.⁵ .............................................. B66B 11/04
[52] U.S. Cl. ..................................... 187/17; 187/112; 310/15
[58] Field of Search ..................... 187/17, 112; 310/12, 310/15, 17

[56] References Cited

U.S. PATENT DOCUMENTS 3,259,769  7/1966  Stott ................................. 310/17 X
4,402,386  9/1983  Ficheux et al. ....................... 187/112
4,916,340  4/1990  Negishi ................................. 310/12

FOREIGN PATENT DOCUMENTS

3422374A1  12/1985  Fed. Rep. of Germany .

Primary Examiner—Robert P. Olszewski
Assistant Examiner—Dean A. Reichard
Attorney, Agent, or Firm—Lloyd D. Doigan

[57] ABSTRACT

An elastic body is provided upon a moveable element of a linear motor, the elastic body in sliding contact with the surface of a stationary element of the linear motor, the elastic body maintaining a predetermined minimum air gap between the moving and stationary elements. A sweeping material is attached upon a portion of the elastic body which contacts the stationary element. Preferably the sweeping material is a woven or non-woven fabric, such as felt or the like.

32 Claims, 5 Drawing Sheets

AIR GAP APPARATUS FOR A LINEAR MOTOR

DESCRIPTION

1. Technical Field

The present relates to an apparatus for maintaining an air gap between a stationary element and a moving element of a linear motor.

2. Background Art

Japanese Patent Publication No. 59-64490 discloses an elevator system employing a linear motor as a driving unit. A stator, which acts as a primary conductor, is affixed to a building. The conductive tape, which serves as a secondary conductor, is disposed in the vicinity of the stator. The stator and the conductive tape form a flat linear motor. An elevator car or a counterweight is moved by the linear motor.

Japanese Patent Publication No. 57-121568 discloses an elevator system employing a toroidal linear motor having a moving primary element and a stationary secondary element which extends through the primary element.

In either case, an air gap has to be maintained between the stationary element and the moving element serving as the primary or secondary conductors of the linear motor. Collisions between the stationary element and the moving element may cause damage to the elements or break the electrical circuit.

DISCLOSURE OF THE INVENTION

It is an object of the invention to minimize collisions between the moving and stationary elements of a linear motor.

It is a further object of the invention to maintain a minimum air gap between the moving and stationary elements of the linear motor to lower noise levels.

It is a further object of the invention to provide a minimum air gap between the moving and stationary elements of the linear motor while removing dust and small metal pieces from the surface of the stationary element.

According to the invention, an elastic body is provided at one end or in the vicinity of one of the ends of a moveable element of a linear motor, the elastic body in sliding contact with the surface of the stationary element, the elastic body maintaining said predetermined minimum air gap between the moving and stationary elements of the linear motor.

According further to the invention, the elastic body disposed at one end of a moving element is utilized within a linear motor which provides the motive force for an elevator.

According further to the invention, the elastic body for maintaining an air gap in a linear motor is provided in a toroidal linear motor.

According further to the invention, a sweeping material is preferably attached on a portion of the elastic body contacting the stationary element. Preferably the sweeping material is a woven or non-woven fabric, such as felt or the like.

According to a preferred construction, the elastic body is bonded to an annular metallic sleeve. The sleeve is removably mounted on a casing of the moving element. The elastic body may have a face formed with one or more projections extending perpendicularly to the travelling axis of the moving element, the peaks of the respective projections serving as contacting portion to contact with the stationary element. The elastic body may also be of hollow annular construction filled with a gas or a liquid. Preferably the elastic body is formed of a soft elastic material.

The elastic body maintains constant contact with the stationary element as it moves with the moving element. The body rarely causes relative movement between the stationary element and the moving element thereby allowing the air gap to be made smaller than a usual air gap. A smaller air gap provides more efficient motor operation. While the moving element travels, a substantially weak force maintains contact between the elastic body and the stationary member. Therefore, the elastic body does not provide significant resistance against movement of the moving element. By providing a sweeping material, such as felt in other woven or non-woven fabrics, noise created by sliding movement of the elastic body is reduced. The sweeping material removes dust and small metal pieces which tend to adhere on the stationary element and which might damage the motor or reduce motor efficiency.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
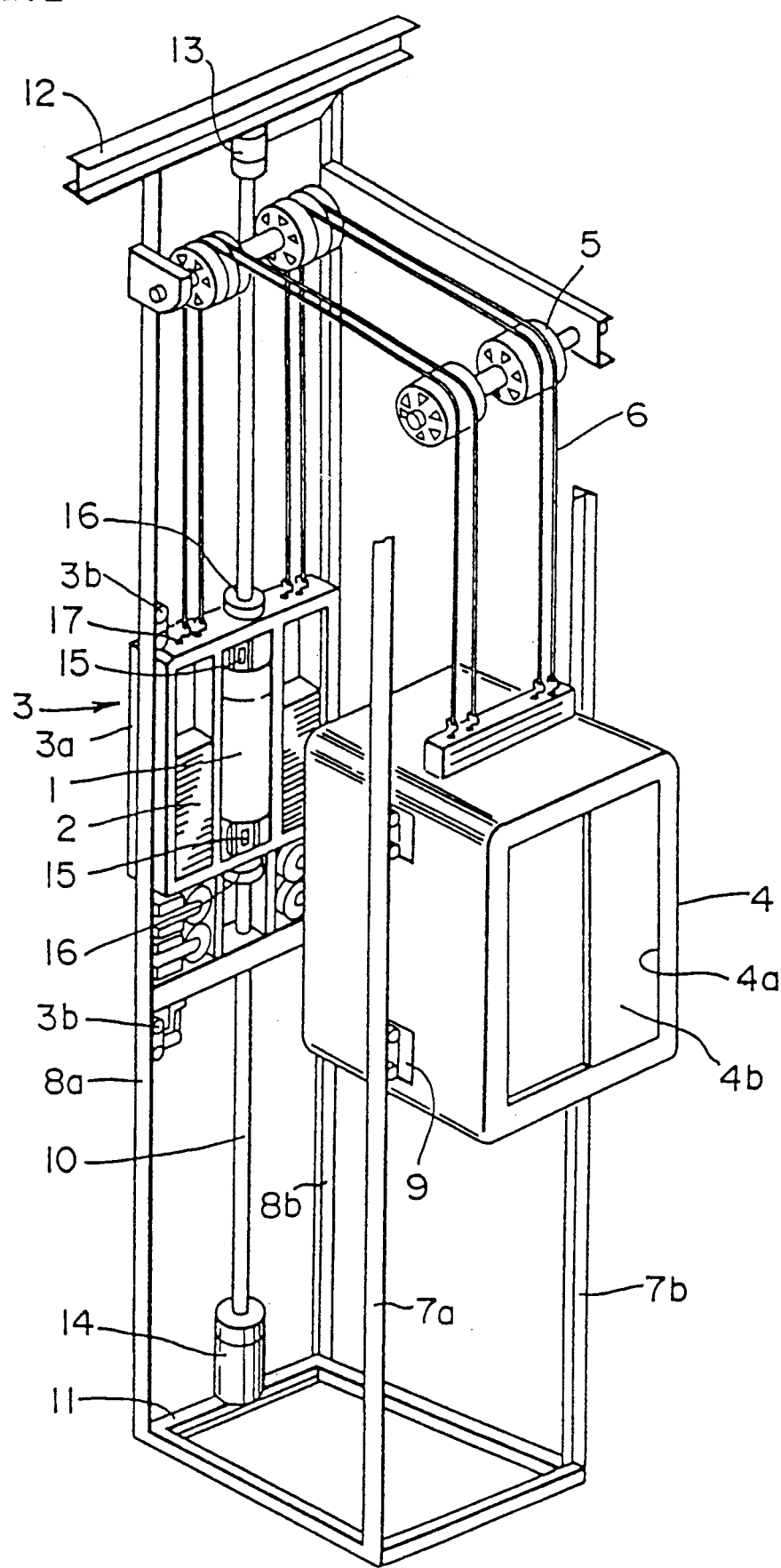
FIG. 1 is a perspective view of an elevator system utilizing an embodiment of an apparatus for maintaining an air gap according to the present invention.

Referring to FIG. 1, a preferred embodiment of an elevator system according to the present invention, which employs a linear motor as a power unit, is shown. A pair of guide rails 7a and 7b are provided. Elevator car 4 has guide rollers 9 which engage the guide rail 7a and 7b for movement therealong. The elevator car has a entrance 4a which is opened and closed by doors 4b.

A pair of guide rails 8a and 8b are provided in parallel with guide rails 7a and 7b. A counterweight unit 3 is guided by guide rails 8a and 8b via guide rollers 3b. The elevator car 4 is connected to the counterweight via ropes 6. The ropes are guided by sheaves 5.

The counterweight unit 3 is comprised of a frame 3a, weights 2 mounted upon the frame, and a braking unit. The weights 2 are separated into two groups along the sides of the counterweight frame. Moving element 1, which serves as a primary conductor of a linear motor for driving the counterweight, and thereby driving the elevator car, is disposed at the center of the counterweight frame between the weights 2. The moving element 1 is connected to a supply cable (not shown) to receive current from a known control circuit (not shown) to generate a magnetic field.

The moving element 1 has an annular shape. Stationary element, column 10, which serves as a secondary conductor, passes through an opening 1e (see FIG. 3) of the moving element 1. The column 10 is fixed to a support 12 by means of a pivot member 13. The column is connected to the support frame 11 by a support member 14. Support member 14 tensions the column 12 to maintain the column vertically. However, the column may pivot about member 13 in response to various external forces.

At least one gap sensor 16 is provided on the upper or lower end of the counterweight frame 3A. The gap sensor senses a distance L between the column 10 and the surface of the opening 1e of the moving element (see FIG. 3). If the distance L between the column and the opening falls below a predetermined distance, a signal signifying an abnormality is sent.

It should be appreciated that the moving element may either be the primary or secondary conductor. Moreover, it should be appreciated that the linear motor may be arranged on the elevator car to directly drive the elevator car. However, as shown, since the weight of the moving element can be utilized as part of the counterweight, it is advantageous to provide the linear motor in the counterweight.

Figure 2:
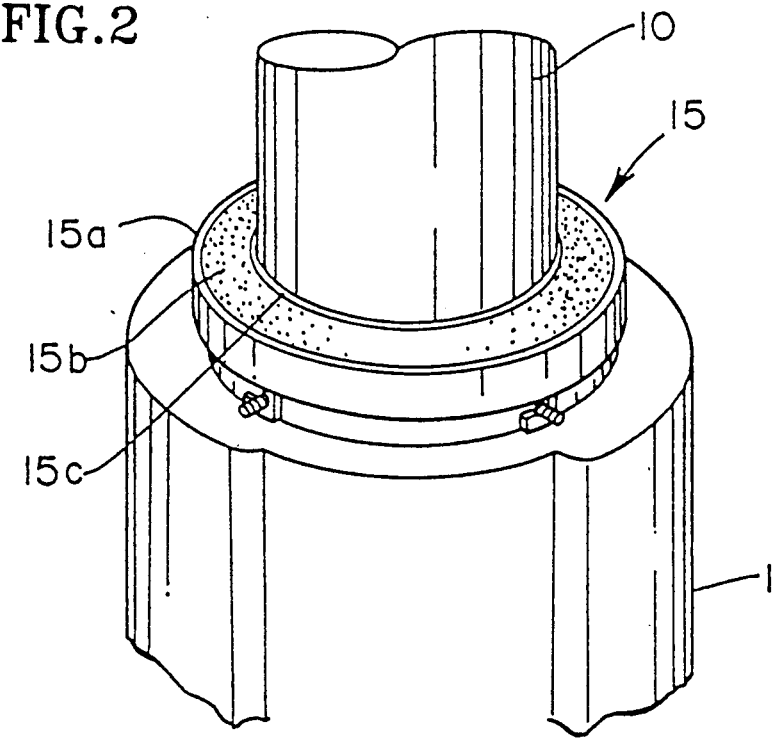
FIG. 2 is a perspective view of a toroidal linear motor of FIG. 1.
Figure 3:
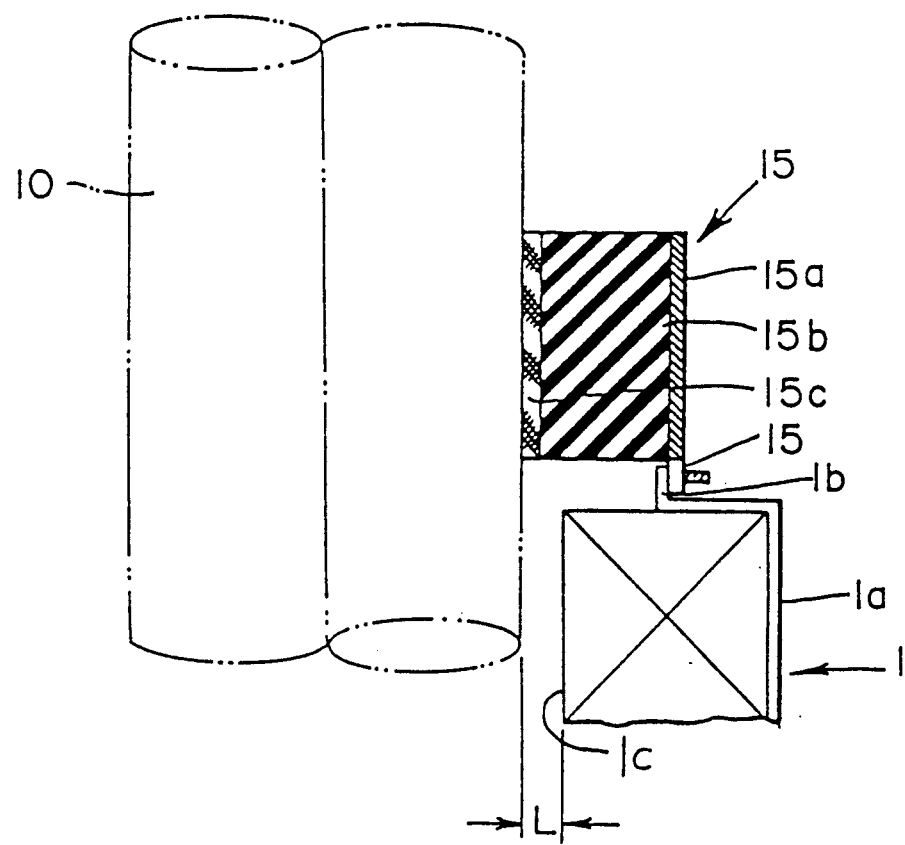
FIG. 3 is a sectional view of the apparatus for maintaining an air gap of FIG. 2.

As shown in FIG. 1, gap units 15 are provided on both the upper and lower ends of the moving element 1. Referring now to FIGS. 2 and 3, the gap unit comprises an outer metallic sleeve 15a, an elastic body 15b and an inner sweeping member 15c. The elastic body may be formed of a soft elastomeric material, such as a soft rubber, a urethane foam or the like. The sweeping member may be formed of a woven or non-woven fabric, such as felt or the like.. The gap unit 15 is disposed about the circumference of the column 10 and has a slight interference fit therewith to maintain the sweeping member 15c in sliding contact with the column.

The elastic body 15b is constructed to generate a small elastic force which is sufficient for maintaining the sweeping member in contact with the surface of the column 10. Therefore, friction between the sweeping member and column is minimized providing substantially low resistance to the travel of the counterweight unit 3. The resistance provided by the sweeping member is very small. When movement between the column 10 and the gap unit occurs, the elastic body 15b restricts the degree of the displacement, so that the predetermined minimum air gap is maintained between the column and the gap unit.

It should be appreciated that, in order to assure restriction of the relative displacement between the column 10 and the moving element 1, the elastic body may be formed as a composite of soft and hard elastomeric materials. In such a case, displacement between the column and moving element is minimized to maintain a minimum air gap.

Figure 4:
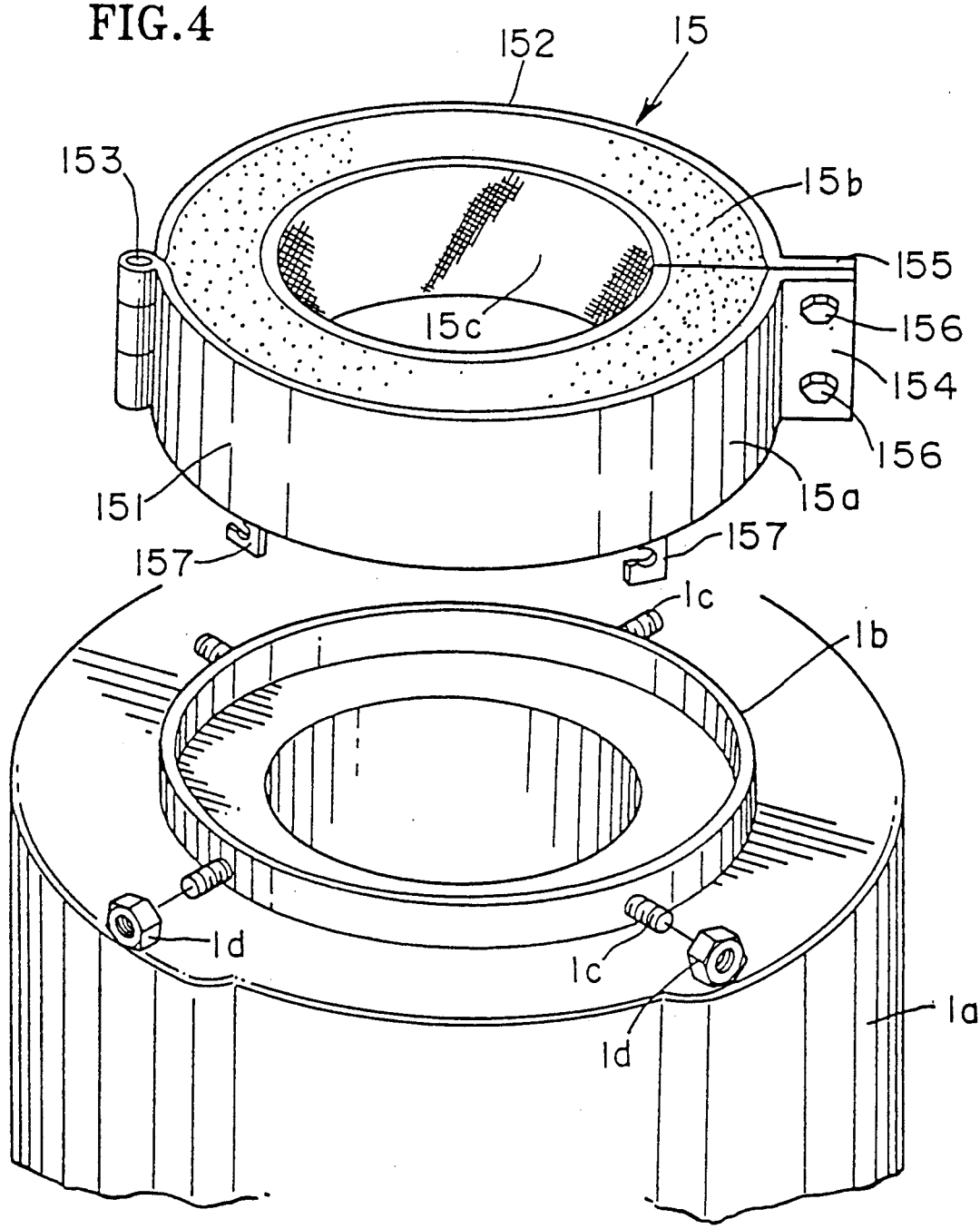
FIG. 4 is a disassembled, perspective view of the apparatus for maintaining an air gap of FIG. 2.
Figure 5:
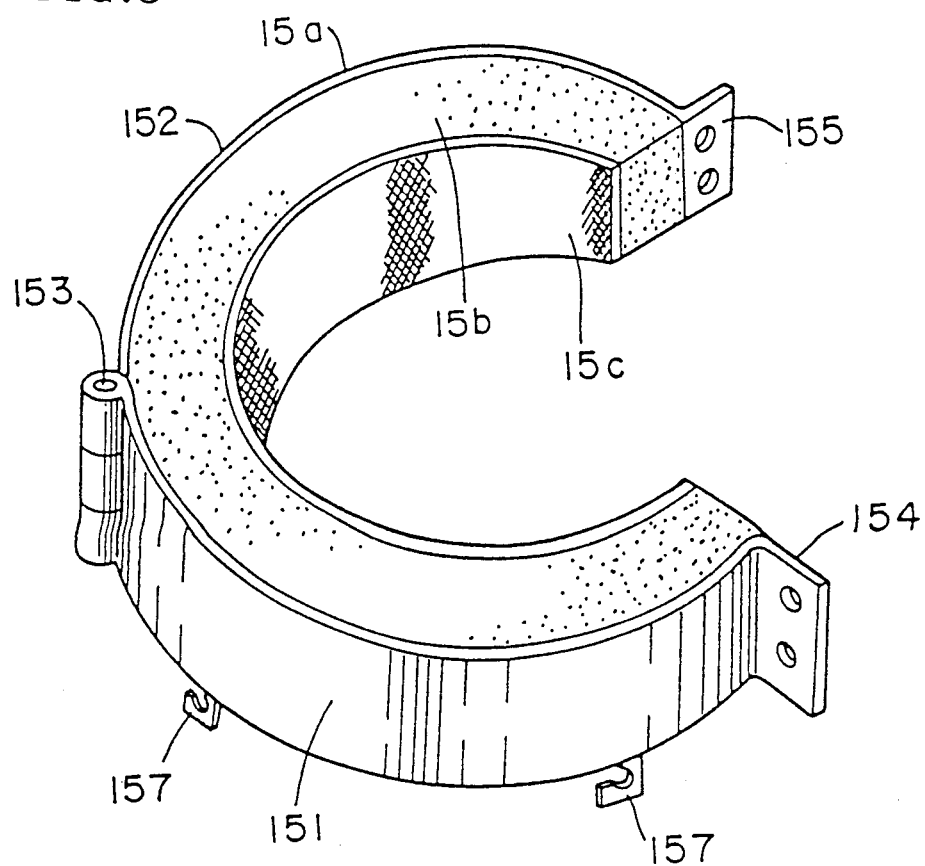
FIG. 5 is a perspective view of the apparatus for maintaining an air gap of FIG. 4.
Figure 6:
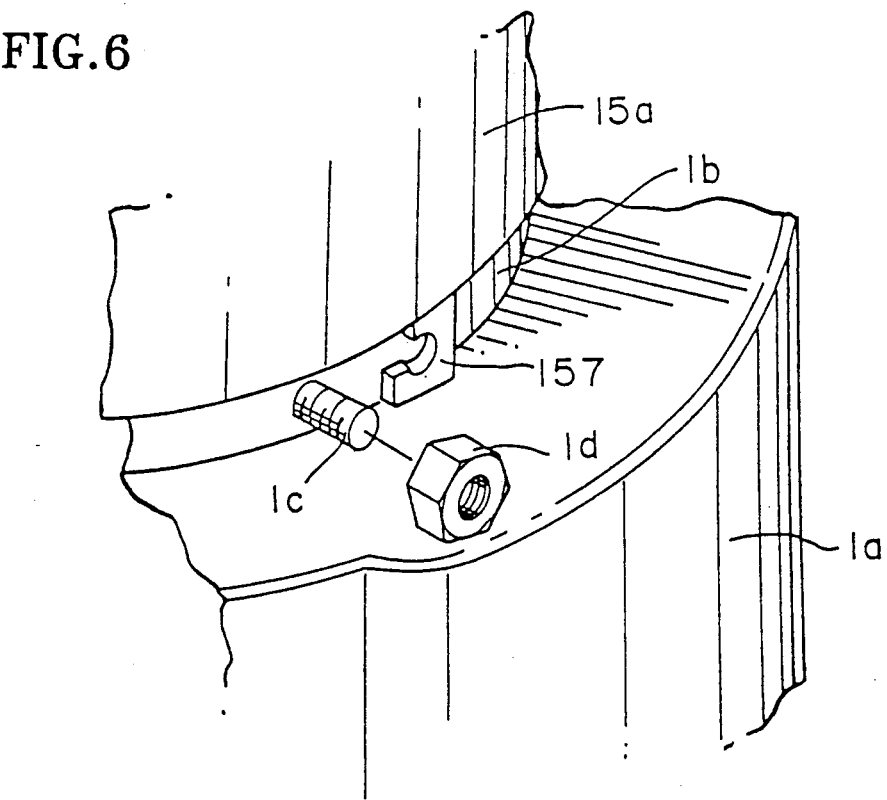
FIG. 6 is an enlarged view of an attachment means of FIG. 4, and FIG. 7-9 are sectional views of embodiments of the apparatus for maintaining an air gap as shown in FIG. 3.

As shown in FIGS. 2 and 4, the metallic sleeve 15a is formed of semicircular metal strips 151 and 152. The strips 151 and 152 are joined at a hinge 153. The elastic body 15b is bonded to the surface of the strips by galvanization or the like. Flanges 154 and 155 are provided at the ends of the respective strips 151 and 152. The flanges are attached to each other by bolts 156. With this construction, the installation or removal of the elastic body unit is facilitated.

The metallic sleeve 15a has a plurality of engaging hooks 157 on lower edges of the sleeve engaging the top of the moving element and on upper edges on the sleeve engaging the bottom edge of the unit. As is seen best in FIG. 4, each engaging hook engages a bolt 1c extending from a flange 1b extending from the upper and lower ends of a cover 1a of the moving element 1. By tightening a nut 1d to each bolt 1c, the gap unit 15 is fixed to the cover 1a of the moving element 1.

Figure 7:
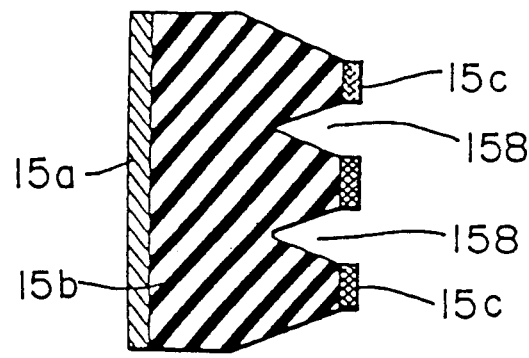
Figure 8:
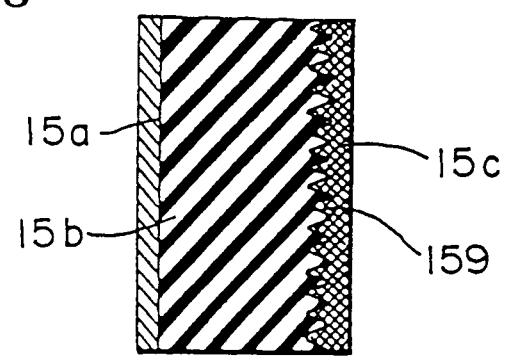
Figure 9:
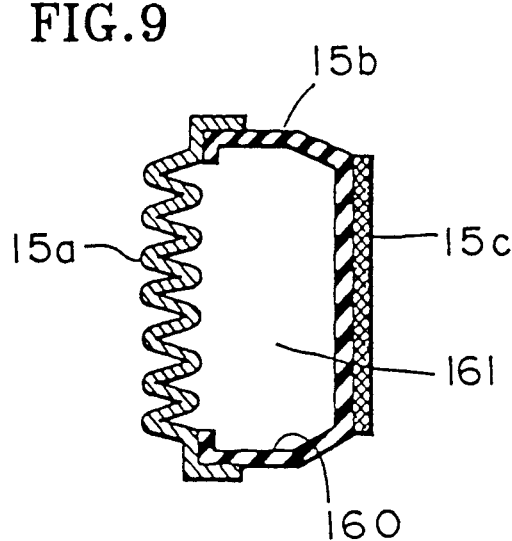

As is seen in FIGS. 7-9, the gap unit may have several configurations. The invention is understood to include all embodiments which can be implemented without departing from the spirit and scope of the invention. For instance, as shown in FIG. 7, V-shaped grooves 158 are disposed within the elastic body 15b. The sweeping member 15c is separated into several pieces in a spaced relationship to one another. This in effect reduces the contact area between the sweeping member and the column 10 for reducing resistance between the sweeping member and the column. In addition, the shown construction is effective for reducing noise as the counterweight unit travels.

As shown in FIG. 8, the elastic body 15b may have uneven surfaces 159 for mating with the sweeping member 15c. This construction reinforces the bond between the elastic body 15b and the sweeping member 15c for preventing the sweeping member from being pulled or peeled off.

As shown in FIG. 9, the elastic body may have a hollow construction filled with a fluid, such as air, or a working fluid. The fluid in the chamber absorbs force which may cause displacement between the column and the moving element. As shown, the elastic body is formed having a U-shaped cross-section 160. The corrugated metallic sleeve 15a closes the U-shape to define a hollow chamber 161. A fluid having good heat conductivity is disposed within the chamber 161. The fluid in the hollow chamber absorbs vibration and acts as heat sink to cool the moving element and the column.

The gap unit operates as follows. As is well known, it is required to space the inner periphery of an electromagnetic coil (i.e. the moving element) from the outer periphery of the column a certain distance L to create an air gap from one to several millimeters. As current is supplied to the moving element 1, an essentially uniform magnetic field is formed around the column 10. The field pulls the moving member towards the column thereby depressing sweeping member 15c upon the circumference of the column with substantially uniform force.

Because a magnetic field is formed by the excitation of the primary coil (i.e. the moving element), a static magnetic force may remain upon the column 10. The static magnetic force draws dust and small metal pieces to the column. The sweeping member 15c of the gap unit slides on the column to remove the dust and small metal pieces therefrom. The sweeping action avoids the ingestion of the dust or metal pieces within the field thereby minimizing the possibility of damage to the linear motor and enhancing motor efficiency.

When the power supply to the moving element is shutoff, the elevator car and the counterweight are stopped. In the absence of the induced magnetic field, the moving element and the column 10 tend to separate. However, as set forth, since the counterweight is guided by the guide rollers 3b and the guide rails 8a, 8b, to maintain a vertical position, and the column is tensioned to maintain a vertical position, the force on the elastic body of the gap unit due to the relative displacement of the column and the moving element is not substantial so the minimum air gap is maintained.

When external forces, such as an earthquake or the like, are exerted upon the column 10 or the counterweight 3, the vibration energy caused by the external factors are absorbed within the elastic body 15b of the gap unit 15 thereby restricting the displacement between the column and the coil thereby avoiding collision between the column and the coil.

Even through the sweeping member 15c slides on the column 10, the noise level of such sweeping is minimized by forming the sweeping member of a relatively soft cloth such as felt. Because of the simple construction of the unit, the gap unit is easy to remove and install making inspection and maintenance easier.

Moreover, the gap unit maintains a predetermined air gap between the column and the coil. Further, dust and small metal pieces are removed from the surface of the column. By providing a hollow elastomeric body, the column and coil can be effectively cooled. It should be noted that the cloth sweeping member may be substituted by a bearing made of a synthetic resin. Such a bearing will reduce friction between the column and the bearing. Furthermore, the bearing may serve to reduce noise created during the travel of the moving element.

Although the invention has been shown and described with the respect to a best mode embodiment thereof, it should be understood by those skilled in the art that the foregoing and various other changes, omissions, and additions in the form and detail thereof may be made therein without departing from the spirit and scope of the invention.

We claim:

1. An apparatus for maintaining an air gap in a linear motor, said linear motor having a stationary element disposed along an axis, and a moving element separated from said stationary element by said air gap, the moving element of the linear motor being driven along the axis, the linear motor converting electrical power into a magnetic driving force, wherein said apparatus comprises;
    at least one elastic body attached to said moving element, said elastic body being in sliding contact with said stationary element, said elastic body being attached to said moving element and disposed in contact with said stationary element such that a predetermined air gap is maintained.

2. The apparatus of claim 1 wherein said elastic body further comprises;
    a sweeping material attaching to said elastic body and contacting said stationary element, said sweeping material removing dust and debris from said stationary element.

3. The apparatus of claim 2 wherein said sweeping material further comprises;
    any one of a woven or non-woven fabric.

4. The apparatus of claim 2 wherein said apparatus further comprises;
    a member on which said elastic body is bonded, said member being removably mounted upon said moving element.

5. The apparatus of claim 2 wherein said elastic body further comprises;
    a plurality of projections extending perpendicular to the traveling axis, said projections serving as contacting portions to contact with said stationary element.

6. The apparatus of claim 1 wherein said elastic body comprises;
    a hollow tube having a chamber filled with a fluid said fluid absorbing vibration and heat.

7. The apparatus of claim 6 wherein said elastic body comprises;
    a soft elastomeric material.

8. The apparatus of claim 7 wherein said elastic body further comprises;
    a urethane foam material.

9. In an elevator system including a car traveling along a predetermined traveling axis, a counterweight connected to said car via a rope and traveling along a predetermined traveling axis essentially parallel to the traveling axis of said car, a linear motor for driving at least one of said car and counterweight, and an apparatus for maintaining an air gap in the linear motor, the linear motor having a stationary element disposed along an axis, and a moving element separated from said stationary element by said air gap, the moving element of the linear motor being driven along the axis, the linear motor converting electrical power into a magnetic driving force, wherein said apparatus comprises;
    at least one elastic body attached to said moving element, said elastic body being in sliding contact with said stationary element, said elastic body being attached to said moving element and disposed in contact with said stationary element such that a predetermined air gap is maintained.

10. The apparatus of claim 9 wherein said elastic body further comprises;
    a sweeping material attaching to said elastic body and contacting said stationary element, said sweeping material removing dust and debris from said stationary element.

11. The apparatus of claim 10 wherein said sweeping material further comprises;
    any one of a woven or non-woven fabric.

12. The apparatus of claim 10 wherein said apparatus further comprises;
    a member on which said elastic body is bonded, said member being removably mounted upon said moving element.

13. The apparatus of claim 10 wherein said elastic body further comprises;
    a plurality of projections extending perpendicular to the traveling axis, said projections serving as contacting portions to contact with said stationary element.

14. The apparatus of claim 9 wherein said elastic body comprises;
    a hollow tube having a chamber filled with a fluid, said fluid absorbing vibration and heat.

15. The apparatus of claim 14 wherein said elastic body comprises;
    a soft elastomeric material.

16. The apparatus of claim 15 wherein said elastic body further comprises;
    a urethane foam material.

17. An apparatus for maintaining an air gap in a toroidal linear motor, said linear motor having a stationary element disposed along an axis, and a moving element having a central opening for receiving the stationary element, the moving element and stationary element being separated by said air gap, the moving element of the linear motor being driven along the axis, the linear motor converting electrical power into a magnetic driving force, wherein said apparatus comprises;

at least one elastic body attached to said moving element about a circumference of said stationary body, said elastic body being in sliding contact with said stationary element, said elastic body being attached to said moving element and disposed in contact with said stationary element such that a predetermined air gap is maintained.

18. The apparatus of claim 17 wherein said elastic body further comprises;
   a sweeping material attaching to said elastic body and contacting said stationary element, said sweeping material removing dust and debris from said stationary element.

19. The apparatus of claim 18 wherein said sweeping material further comprises;
   any one of a woven or non-woven fabric.

20. The apparatus of claim 17 wherein said apparatus further comprises;
   an annular sleeve member on which said elastic body is bonded, said sleeve member being removably mounted upon said moving element.

21. The apparatus of claim 18 wherein said elastic body further comprises;
   a plurality of projections extending perpendicular to the traveling axis about the circumference of said stationary element said projections serving as contacting portions to contact with said stationary element.

22. The apparatus of claim 18 wherein said elastic body comprises;
   a hollow annulus having a chamber filled with a fluid said fluid absorbing vibration and heat.

23. The apparatus of claim 17 wherein said elastic body comprises;
   a soft elastomeric material.

24. The apparatus of claim 23 wherein said elastic body further comprises;
   a urethane foam material.

25. In an elevator system including a car traveling along a predetermined traveling axis, a counterweight connected to said car via a rope and traveling along a predetermined traveling axis essentially parallel to the traveling axis of said car, a toroidal linear motor for driving at least one of said car and counterweight, and an apparatus for maintaining an air gap in the toroidal linear motor, the linear motor having a stationary element disposed along an axis, and a moving element having a central opening for receiving the stationary element, the moving element and stationary element being separated by said air gap, the moving element of the linear motor being driven along the axis, the linear motor converting electrical power into a magnetic driving force, wherein said apparatus comprises;
   at least one elastic body attached to said moving element about a circumference of said stationary element, said elastic body being in sliding contact with said stationary element, said elastic body being attached to said moving element and disposed in contact with said stationary element such that a predetermined air gap is maintained.

26. The apparatus of claim 25 wherein said elastic body further comprises;
   a sweeping material attaching to said elastic body and contacting said stationary element, said sweeping material removing dust and debris from said stationary element.

27. The apparatus of claim 26 wherein said sweeping material further comprises;
   any one of a woven or non-woven fabric.

28. The apparatus of claim 25 wherein said apparatus further comprises;
   an annular sleeve member on which said elastic body is bonded, said sleeve member being removably mounted upon said moving element.

29. The apparatus of claim 25 wherein said elastic body further comprises;
   a plurality of projections extending perpendicular to the traveling axis about the circumference of said stationary element, said projections serving as contacting portions to contact with said stationary element.

30. The apparatus of claim 25 wherein said elastic body comprises;
   a hollow annulus having a chamber filled with a fluid said fluid absorbing vibration and heat.

31. The apparatus of claim 25 wherein said elastic body comprises;
   a soft elastomeric material.

32. The apparatus of claim 31 wherein said elastic body further comprises;
   a urethane foam material.

* * * * *